Patented Apr. 26, 1949

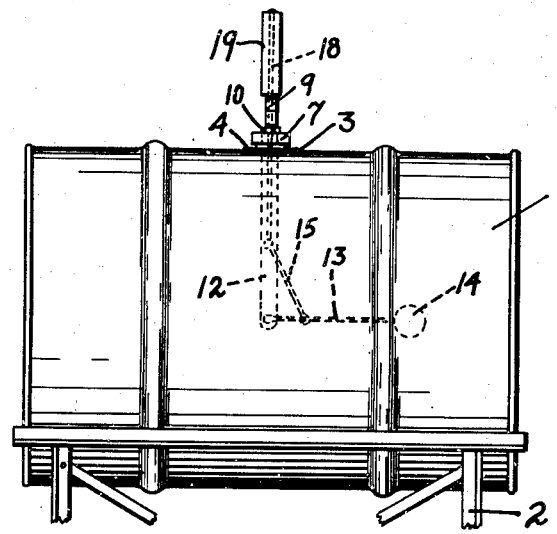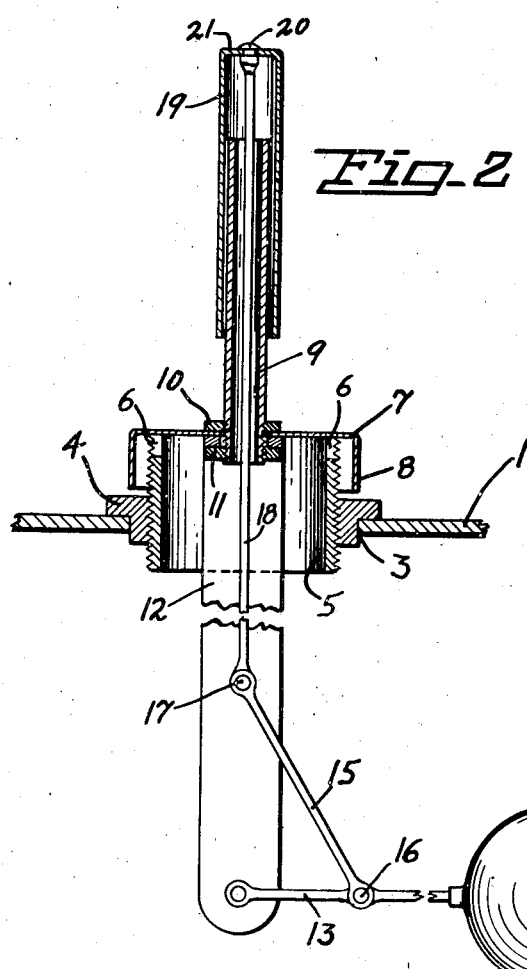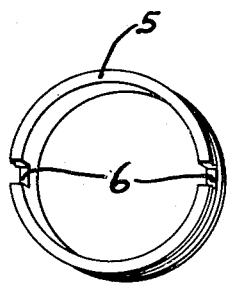

2,468,284

UNITED STATES PATENT OFFICE 2,468,284

LIQUID LEVEL GAUGE

Theovald F. Balken, Spokane, Wash.

Application June 14, 1947, Serial No. 754,712

3 Claims. (Cl. 73—317)

This invention relates to a tank gauge and it is one object of the invention to provide a gauge adapted to be mounted through a bung hole, or other hole formed through a wall of a tank, and serve to visually indicate the amount of liquid in the tank.

Another object of the invention is to provide a gauge having a tube supported in an upright position over a tank or drum which is shiftable vertically by action of a float disposed within the tank or drum and having movement in response to changes in the quantity of liquid therein.

Another object of the invention is to so form the carrier of the tube that it may be very easily mounted through a bung hole in a tank or drum and a vent formed about the base of the support to allow the entering of air but will prevent water from entering the tank.

Another object of the invention is to provide a gauge wherein the indicator consists of a tube, which has its upper end closed and secured to a vertical rod which has its lower or inner end pivoted to a link by means of which it is connected with a pivoted arm carrying a float at one end and having its other end pivoted to a support extending downwardly from the carrier for the tube, the tubular indicator encircling a smaller tube having indicia thereon by which means the amount of liquid in the barrel may be ascertained.

Another object of the invention is to provide a gauge which is of simple construction capable of being easily applied to or removed from a drum, and very dependable in its operation.

The invention is illustrated in the accompanying drawings wherein:

Fig. 1 is a side view of a drum having the improved gauge applied thereto.

Fig. 2 is a view showing the upper portion of the drum and the improved gauge in vertical section.

Fig. 3 is a perspective view of the support for the gauge having vents formed therein.

The drum or tank 1 is formed of strong metal and may be of any length and diameter desired. In the present illustration, the drum is supported upon a frame or cradle 2, it being understood that any desired form of support may be provided for the drum. At its top, the drum is formed with an opening 3, through which an internal threaded ring 4 passes, the ring constituting a bung hole for the drum. This is the usual manner in which bung holes for metal drums and tanks are formed, and since the ring is internally threaded, a coacting externally threaded ring 5 may be screwed into the bung hole. The externally threaded ring 5 is formed with notches 6, which form vents to the interior of the drum when the improved gauge is placed thereon.

As the oil or other liquid contents of the drum is used, its level in the drum is lowered and when a person desires to know how much liquid remains in the tank it is customary to remove the plug from the bung hole and thrust a stick or other rod into the drum through the bung hole. When the stick is withdrawn, the portion which enters the liquid will be wet and this will show the quantity of liquid in the drum. This is unsatisfactory, as the liquid may become exhausted before the test is made.

The improved gauge, constituting the subject matter of this invention, is of such construction and so mounted that it protrudes upwardly from the tank and can be seen and read without it being necessary to remove a plug and thrust a stick or rod into the tank. This gauge has a base 7, formed with a downwardly extending flange 8 of such diameter that it may cover the upper portion of ring 5. Tube 9, which is externally threaded at its lower end, has a nut 10 threaded thereon and a complementary nut 11 between which two nuts the cap 7 and the downwardly extending arm 12 are secured. On the lower end of arm 12 is pivoted a shaft 13, carrying a float 14 at its outer end and having a link 15 pivoted at 16. The link 15 is pivotally secured at 17 to vertical shaft 18, which carries the gauge tube 19 by means of a screw or rivet 20 passing through the closed upper end 21 of tube 19. In order to visually indicate the quantity of liquid in the drum the tube 9 has indicia on its periphery, which may be marked off in gallons. When the drum is full of liquid, the float 14 rises to the top and through the means of arm 13, mark 15 and shaft 18 raise tube 19, thus showing the drum full or the number of gallons contained therein. As the liquid is used, the float 14 lowers with the liquid level, allowing the tube 19 to descend, thus indicating the amount of liquid remaining in the barrel. To fill the barrel, the improved gauge need only be removed from the ring 5 and the filling hose inserted.

In the event the drum has a filling opening at its end instead of in a side portion, which is disposed upwardly when the drum is resting in horizontal position upon the support, an opening may be cut through the upper side of the drum of a diameter to receive the downwardly extending arm 12 and the cap 7 may rest upon the drum 1.

Having thus described the invention, what is claimed is:

1. A gauge for indicating the quantity of liquid in a drum, said gauge comprising a base having a downwardly extending rim, a tube having indicia on its outside periphery, said tube being threaded at its lower end and passing through the center of the base, nuts threaded onto the tube and applying gripping action to upper and lower faces of the base to secure the tube, a downwardly extending arm having its upper end engaged about the lower end of the tube between the base and the lower one of said nuts and gripped between the base and the said lower nut, a tube of larger diameter vertically slidable over the smaller tube and closed at its upper end, a rod secured to the closed end of the larger tube and extending downwardly through the smaller tube, a link connecting the rod with a shaft, said shaft having an inner end pivoted to the lower end of the downwardly extending arm for vertical swinging movement, a float at the outer end of said shaft for shifting the rod and larger tube to a vertically adjusted position in response to swinging movement of the shaft, a ring adapted to be threaded into the bung hole of a drum, said ring having notches formed in its upper edge and being of a diameter adapting it to fit loosely into the base and serve as a rest for the base of the gauge.

2. A liquid level gauge comprising a sleeve adapted to be removably mounted vertically through a hole in a container, a base upon the upper end of said sleeve, a tube mounted vertically through said base, a strip extending downwardly through said sleeve from said base and having its upper end formed with a side extension formed with an opening through which the tube passes, a nut upon the lower end of said tube, clamping the side extension against said base, a rod shiftable vertically through said tube, a hood carried by the upper end of said rod and fitting loosely about the tube, said tube having scale mounting thereon progressively hidden by downward movement of the rod and the hood and an arm pivoted to the lower end of said strip and carrying a float and being connected with said rod to shift the rod vertically when the arm is tilted.

3. A liquid level gauge comprising a base, a support for said base adapted to be mounted through an opening in a container, a tube disposed vertically through said base and open at its upper and lower ends, an arm disposed vertically under the base and having its upper end formed with a side extension through which the lower end of the tube extends, a nut secured upon the lower end of said tube and engaging the side extension to grip the same and secure the arm in its vertical position, a lever pivoted to the lower end portion of said arm and carrying a float, a rod slidable through said tube and projecting from ends thereof, a link pivoted to the lever and the lower end of said rod, and a hood slidably fitting about said tube and connected with the upper end of said rod for vertical movement with the rod, said tube having scale markings in a vertical line thereon progressively brought into and out of view by vertical movement of the hood.

THEOVALD F. BALKEN.

REFERENCES CITED

The following references are of record in the file of this patent:

UNITED STATES PATENTS

| Number | Name | Date |
| --- | --- | --- |
| 191,971 | Johnston | June 12, 1877 |
| 1,488,754 | Kempel | Apr. 1, 1924 |
| 2,255,310 | D'Arcey | Sept. 9, 1941 |